July 9, 1968 H. REINSCH 3,391,978
EXPOSURE CONTROL FOR MOTION-PICTURE CAMERAS
Filed May 12, 1965 2 Sheets-Sheet 1

INVENTOR:
HERBERT REINSCH

By Michael J. Striker
his ATTORNEY

INVENTOR:

HERBERT REINSCH

By his ATTORNEY

United States Patent Office 3,391,978
Patented July 9, 1968

3,391,978
EXPOSURE CONTROL FOR MOTION-PICTURE
CAMERAS
Herbert Reinsch, Stuttgart, Germany, assignor to Eugen
Bauer G.m.b.H., Stuttgart-Unterturkheim, Germany
Filed May 12, 1965, Ser. No. 455,159
Claims priority, application Germany, May 16, 1964,
B 76,812
14 Claims. (Cl. 352—141)

ABSTRACT OF THE DISCLOSURE

A motion picture camera wherein the shutter deflects scene light onto a photosensitive resistor in an exposure meter which adjusts the diaphragm as a function of scene brightness. The diaphragm is arrested during acceleration of the shutter from zero speed to normal speed so that its aperture is a function of that scene brightness which prevailed immediately prior to acceleration of the shutter. The diaphragm is arrested by disconnecting the galvanometer in the exposure meter from the energy source or by reducing the flow of current to such an extent that the output member of the galvanometer cannot react to changes in resistance of the photosensitive receiver.

The present invention relates to motion-picture cameras in general, and more particularly to an improved exposure control for such cameras. Still more particularly, the invention relates to improvements in the control of such exposures which are made by a motion-picture camera during intervals when the shutter is accelerated from zero speed to a predetermined operating speed. Motion-picture cameras of the type to which my present invention pertains are provided with a built-in exposure meter which insures that the size of the diaphragm opening is a function of the intensity of light coming from a subject or scene to be photographed.

A series drawback of heretofore know motion-picture cameras is that the size of the diaphragm opening varies during the interval when the shutter is accelerated from zero speed to a predetermined speed. The interval required for such acceleration is rather short; nevertheless, and since a modern exposure meter is a highly sensitive electrical instrument, it will respond to minimal fluctuations in the intensity of light which take place during such acceleration and will cause the diaphragm mechanism to define an opening whose size is not an exact function of the intensity of measured light and which will cause the camera to take blurred, streaky or otherwise defective pictures.

Accordingly, it is an important object of the present invention to provide a motion-picture camera which is constructed and assembled in such a way that during the rather short interval which is necessary for acceleration of the shutter to operating speed, the size of the diaphragm opening remains unchanged.

Another object of the invention is to provide a motion-picture camera of the just outlined characteristics wherein the exposure meter is free to change the size of the diaphragm opening in a fully automatic way as soon as the shutter begins to rotate at a normal operating speed or as soon as the shutter comes to a halt.

A further object of the invention is to provide a novel control unit which will automatically prevent any changes in the size of the diaphragm opening during acceleration of the shutter from zero speed to normal operating speed and wherein such control unit occupies very little room so that it may be readily installed in the housing of a motion-picture camera without adding to the bulkiness of the housing.

An additional object of the invention is to provide a novel electric circuit which may be utilized in a camera of the above described character and which embodies the aforementioned control unit.

Still another object of the invention is to provide a motion-picture camera wherein the exposure meter reacts to changes in the intensity of light which is reflected, at least in part, by the shutter proper so that the light which controls the size of the diaphragm opening is the same light which will reach the film when the aperture of the shutter registers with the optical axis of the objective.

A concomitant object of the instant invention is to provide a motion-picture camera wherein any undesirable variations in the size of the diaphragm opening are prevented only during such intervals when the size of the diaphragm opening is already adjusted to allow a requisite amount of light to reach the film frame which is momentarily located behind the aperture of the shutter and wherein, under all other operating conditions, the size of the diaphragm opening may be varied in a fully automatic way to reflect with utmost accuracy the intensity of light that comes from a subject or scene upon which the objective of the camera is trained when the shutter is idle or when the shutter is driven at a desired constant speed.

Another object of the present invention is to provide an electric circuit which embodies the aforementioned control unit and which can be installed in many existing types of motion-picture cameras without necessitating substantial alterations in the construction and/or operation of such cameras.

In one of its broader aspects, the present invention resides in the provision of a motion-picture camera which comprises a normally idle rotary shutter having an aperture and a light reflecting surface, objective means for directing light coming from a subject against the shutter so that such light is reflected on the shutter surface when the aperture is out of registry with the objective means, means for intermittently rotating the shutter at a predetermined speed whereby the acceleration of the shutter from zero speed to such predetermined speed requires a certain interval of time with attendant fluctuations in the intensity of reflected light even if the intensity of light entering through the objective means remains unchanged, exposure meter means comprising a movable portion whose position is a function of the intensity of reflected light so that the movable portion tends to oscillate during acceleration of the shutter, a diaphragm mechanism operatively connected with the exposure meter means and defining a variable opening whose size is a function of the position of the movable portion, and control means for fixing the movable portion against movement during acceleration of the shutter to prevent variations in the size of the diaphragm opening during the interval which is required for such acceleration of the shutter.

In accordance with a more specific feature of my invention, the improved motion-picture camera comprises an objective, preferably a zoom lens, a shutter rotatable about a fixed axis which is parallel to the optical axis of the objective and defining an aperture through which light entering through the objective passes during a portion of each revolution of the shutter, a surface provided on the shutter to reflect light when the aperture is moved out of registry with the objective and comprising a first portion or zone of lesser reflecivity located in the path of light when the shutter is idle and a second portion or zone of greater reflectivity, the difference between the reflectivity of such zones being selected in such a way that the intensity of reflected light when the shutter is idle at least approximates average intensity of reflected light during a full revolution of the shutter at a predetermined speed, a photo-electric resistor located in the path of reflected light so that its resistance is a function of the intensity of such light, a source of electrical energy connected in circuit with the resistor, a galvanometer connected in circuit with the resistor and comprising a movable portion or rotor whose position varies as a function of the resistance of the resistor, the rotor being idle when the strength of current flowing in the circuit of the resistor drops to below a given minimum value and the rotor also tending to oscillate during acceleration of the shutter to the predetermined speed, control means for reducing the flow of current to below such minimum value during acceleration of the shutter to prevent oscillation of the rotor, and a diaphragm mechanism defining an opening whose size is variable by the rotor so that, during acceleration of the shutter, the size of the diaphragm opening remains unchanged.

The control means for reducing the flow of current during acceleration of the shutter may comprise a control switch which is connected in the circuit of the exposure meter and which opens for a predetermined interval of time (corresponding in length to the time necessary for acceleration of the shutter from zero speed to a predetermined speed) so that there is no flow of current during acceleration of the shutter.

It is also possible to replace the control switch with a capacitor which is charged during acceleration of the shutter to thereby reduce the flow of current through the exposure meter and which is fully charged at the time the shutter begins to rotate at a predetermined constant speed.

It will be seen that the improved camera comprises a diaphragm mechanism whose opening is varied in dependency on the intensity of incoming light and whose size remains unchanged during the interval which is necessary to allow for acceleration of the shutter from zero speed to a given constant speed. This enables the camera to take exceptionally sharp and clear pictures because the intensity of light and hence the size of the diaphragm opening, remains unchanged until the shutter begins to rotate at a desired speed. On the other hand, the exposure meter is free to adjust the size of the diaphragm opening as a function of the intensity of incoming light as soon as the shutter begins to rotate at full speed, at one of several constant speeds, or as soon as the shutter comes to a halt.

The novel features which are considered as characteristic of the invention are set forth in particular in the appended claims. The improved motion-picture camera itself, however, both as to its construction and the mode of manipulating the same, together with additional features and advantages thereof, will be best understood upon perusal of the following detailed description of certain specific embodiments with reference to the accompanying drawings, in which:

Figure 1:
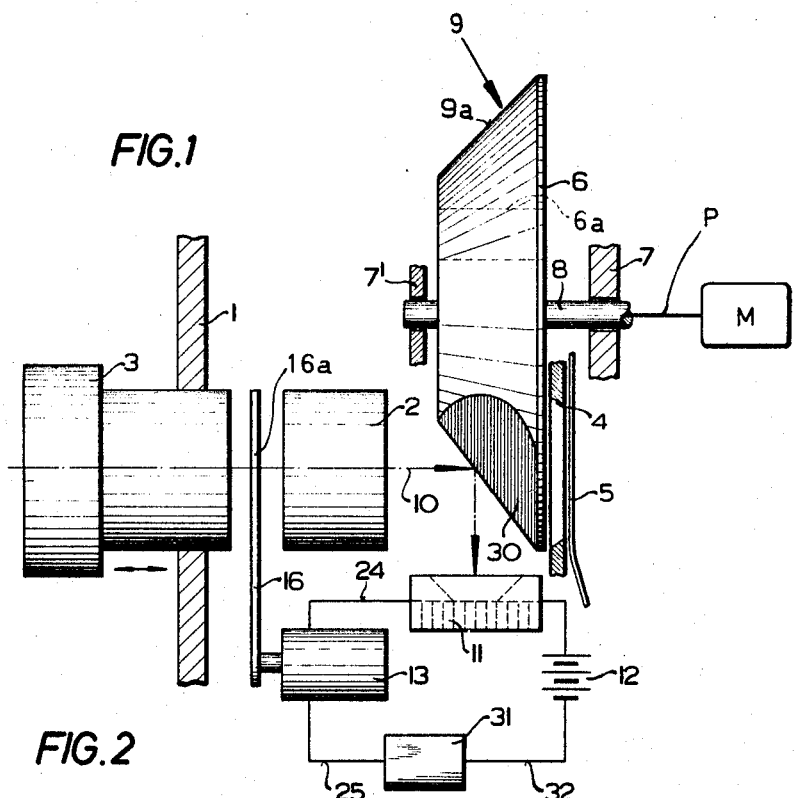
FIG. 1 is a diagrammatic fragmentary vertical section through the housing of a motion-picture camera wherein the circuit of the photoelectric resistor is assembled in accordance with a first embodiment of my invention.

Referring to FIG. 1, the front wall 1 of the improved motion-picture camera carries a reciprocable lens component 3 forming part of an objective here shown as a zoom lens. The fixed lens component 2 of the objective is mounted in the camera housing behind the reciprocable lens component 3. An aperture plate 4 or film gate is installed behind the fixed lens component 2, and the film 5 is guided in a predetermined path a portion of which extends directly behind the aperture plate 4. The mechanism for transporting the film 5 at a single constant speed or, at two or more different speeds forms no part of the present invention and is not shown in the drawings.

A rotary disk-shaped shutter 6 is mounted on a horizontal shaft 8 and is rotatable in a vertical plane extending between the aperture plate 4 and the fixed lens component 2. The shutter 6 is provided with an arcuate aperture 6a and its shaft 8 is rotatable in bearing plates 7, 7' mounted in the interior of the camera housing. The axis of the shaft 8 is parallel to the optical axis of the objective, and this shaft may be driven by a motor M through the intermediary of a power train P.

Figure 3:
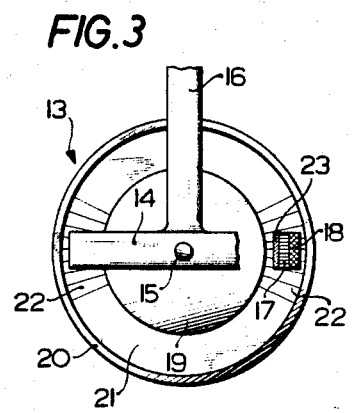
FIG. 3 is a front elevational view of a galvanometer which is utilized in the camera of FIG. 1, the rotor of the galvanometer being partly broken away.

The front portion of the shutter 6 is of frustoconical shape and is provided with a light reflecting surface 9. The light rays 10 which come from the subject enter through the objective 2, 3 and may be reflected on the surface 9 to impinge against a photoelectric resistor 11 forming part of an exposure meter. The circuit of the exposure meter further includes a battery 12 or another suitable source of electrical energy, and a galvanometer 13. The galvanometer includes a movable portion or rotor 14, see FIG. 3, which is rotatable on or with a shaft 15 with a minimum of friction and which carries a diaphragm mechanism 16. The rotor 14 further carries two coils 17 and 18, the coil 18 being wound around the coil 17. The galvanometer 13 also comprises a strong permanent magnet 19 which resembles a solid cylinder, and this magnet 19 is spacedly and coaxially surrounded by a hollow cylindrical shell 20 which consists of iron. The reference numerals 22 indicate magnetic force lines in the annular gap 21 between the magnet 19 and shell 20. The gap 21 accommodates two bent-over legs 23 of the rotor 14 and portions of the coils 17, 18 which are carried by the legs 23.

Figure 4:
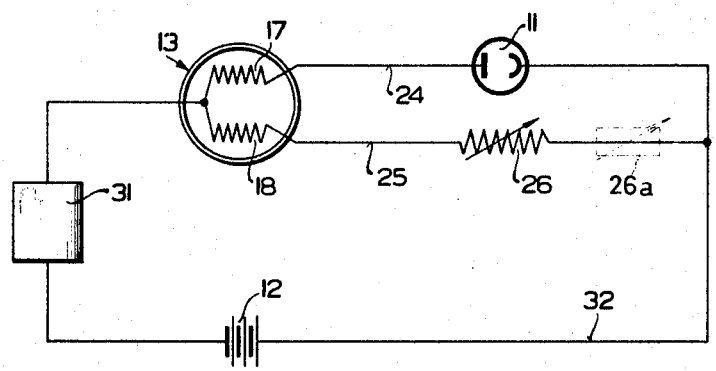
FIG. 4 illustrates the electric circuit of the camera shown in FIGURE 1.

FIG. 4 shows that the coils 17, 18 are installed in parallel leads 24, 25 of an electric circuit which includes the battery 12 and the photoelectric resistor 11. This circuit is accommodated in the housing of the motion-picture camera. The lead 24 contains the resistor 11, and the lead 25 contains a variable resistor 26 which may be regulated to balance the circuit. If necessary, the lead 25 may contain one or more additional variable resistors 26a (one shown by phantom lines) whose resistance will be selected in dependency on the sensitivity of the film 5, on the exact speed at which the film is transported past the aperture plate 4, and on certain other factors. Such resistor or resistors 26a may be adjusted by hand.

When the shutter 6 is idle, light rays 10 entering through the objective 2, 3 are reflected on a first portion or zone 30 of the surface 9. The portion 30 resembles a grid and its reflectivity is less than the reflectivity of the second portion 9a of the surface 9. This is necessary because, when the shutter 6 rotates, the resistor 11 will receive light only at such times when the aperture 6a is out of registry with the objective, i.e., the average intensity of reflected light during a full revolution of the shutter 6 is less than the intensity of light which is reflected by the relatively smooth mirror-like portion 9a of the surface 9. To compensate for such reduced intensity during rotation of the shutter 6, the reflectivity of the grid 30 is less than that of the surface portion 9a, and the relationship between the reflectivity of the grid 30 and surface portion 9a is such that the intensity of light reflected by the grid 30 at least approximates average intensity of light which is reflected during a full revolution of the shutter 6 at the time the shutter rotates at its normal constant speed.

Also, when the shutter 6 is being accelerated from zero speed to full speed, the intensity of light reaching the resistor 11 will tend to fluctuate because the difference in reflectivity of grid 30 and surface portion 9a is selected with a view to insure that the intensity of light reaching the resistor 11 when the shutter 6 is idle (by being reflected on the grid 30 corresponds to average intensity of light which is reflected onto the resistor 11 during a full revolution of the shutter at a constant operating speed. The fluctuations in the intensity of light reaching the resistor 11 will be more pronounced when the shutter 6 rotates at less than normal speed. Of course, if the intensity of light fluctuates during acceleration of the shutter 6, such fluctuations will cause the resistor 11 to change its resistance as a function of such intensity and, in the absence of remedial action, the rotor 14 of the galvanometer 13 would oscillate to change the size of the diaphragm opening 16a at a time when such change in the size of this opening is not a function of the intensity of light which will reach the film 5 when the aperture 6a registers with the objective 2, 3.

The interval during which the shutter 6 is accelerated from zero speed to full operating speed is very short; nevertheless, during such acceleration the size of the diaphragm opening 16a might not reflect, with sufficient accuracy, the intensity of light which comes from the subject. Therefore, I provide a control unit which insures that the rotor 14 of the galvanometer 13 remains stationary and does not change the size of the diaphragm opening 16a while the shutter 6 changes its speed from zero speed to full speed. The reasons that the shutter 6 will require some time for acceleration to full speed will be readily understood, i.e., inertia of the parts comprising the shutter 6 inclusive of that part of the shutter which defines the reflecting surface 9, the shaft 8 and the power train P between the motor M and the shaft 8 will tend to oppose immediate acceleration of the shutter to normal operating speed. The total amount of light reaching the resistor 11 during a full revolution of the shutter 6 is always the same regardless of the speed at which the shutter rotates provided, of course, that the intensity of light entering through the objective remains unchanged. However, if the shutter rotates at a speed which is not constant, the galvanometer 13 will react more strongly to abrupt changes in intensity of reflected light which take place when the grid 30 moves out of the path of the light and the surface portion 9a enters such path, or vice versa. Of course, even stronger fluctuations will take place when the aperture 6a moves into or out of registry with the objective because the resistance 11 does not receive any light when the aperture 6a allows the light to pass through the aperture plate 4. Therefore, the rotor 14 will tend to change the size of the diaphragm opening 16a in order to admit more or less light which, of course, could result in overexposure or underexposure of the film. In other words, rotor 14 will tend to oscillate until the shutter 6 reaches its normal speed. During such oscillation, the size of the diaphragm opening 16a changes even if the intensity of light entering through the objective remains unchanged. If the rotor 14 is allowed to oscillate, the sharpness and clarity of pictures will be reduced because overexposed areas will alternate with underexposed areas.

In accordance with an important feature of my invention, the flow of current through the coils 17, 18 of the galvanometer 13 is reduced during acceleration of the shutter 6, and the reduction in the flow of current is such that the remaining current is too weak to effect any changes in the position of the rotor 14 so that, during acceleration of the shutter 6, the size of the diaphragm opening 16a remains unchanged. This can be achieved in several ways, for example, by opening the circuit of the galvanometer 13 so that no current can flow through the coils 17, 18, or by reducing the current flow to such an extent that very small friction between the rotor 14 and its bearings, as well as the inertia of the rotor 14 and diaphragm mechanism 16 prevents any changes in angular position of the rotor 14 whereby the size of the diaphragm opening 16a remains unchanged.

In the embodiment of FIGS. 1 to 4, the electric circuit of the exposure meter comprises a control switch 31 which suddenly opens the circuit during acceleration of the shutter 6 so that the rotor 14 is arrested or fixed in a position corresponding to the intensity of light which was reflected on the grid 30 and which reached the resistor 11 immediately prior to starting of the shutter 6. In other words, the rotor 14 and the diaphragm mechanism 16 will be immobilized in such positions which correspond to intensity of light reflected by the grid 30 immediately prior to actuation of a release trigger 47 which allows the shutter 6 to start its rotary movement.

Figure 2:
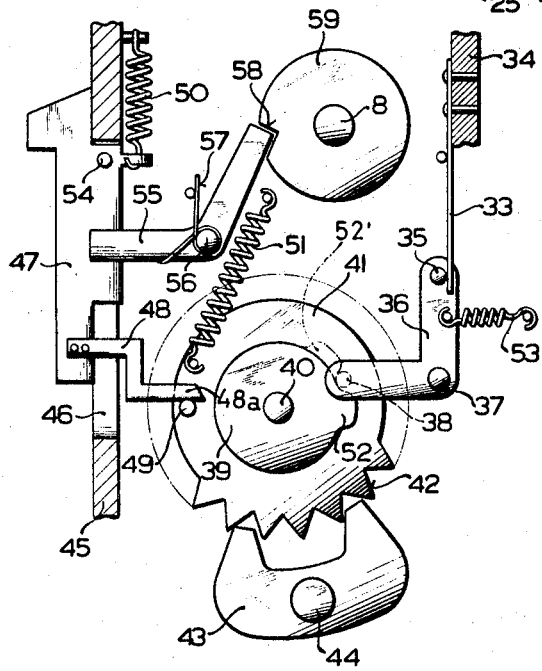
FIG. 2 is an enlarged detail view of a control switch which is utilized in the camera of FIG. 1.

The construction of the control switch 31 is shown in FIG. 2. This switch is installed in the lead 32 connecting one pole of the battery 12 with the galvanometer 13 and comprises a fixed contact 33 and a movable contact 35. The fixed contact 33 is a leaf spring which is attached to a stationary plate-like carrier 34. The movable contact 35 is a pin which is mounted at the free end of one arm forming part of a bell crank lever 36, this lever being rockable about a fixed pivot pin 37 and being biased by a return spring 53 which tends to maintain the pin 35 in abutment with the free end of the spring 33. The other arm of the lever 36 carries a pin-shaped follower 38 which is under the bias of the spring 33 and tracks the face of a disk-shaped cam 39. This cam is provided with a radially outwardly extending lobe 52. Thus, the spring 53 (which is rather weak) biases the pin 35 against the spring 33 (which is stronger than the spring 53), and the spring 33 biases the follower 38 against the face of the cam 39. The cam 39 is mounted on and is rotatable about the axis of a shaft 40 which also carries an escapement wheel 41 having teeth 42 cooperating with the pallets of an escapement anchor 43 which is rockable on a pin 44.

A wall 45 of the camera housing is provided with a slot 46 for a portion of the release trigger 47. This trigger has a suitably bent arm 48 which transmits motion to a stop pin 49 mounted on the escapement wheel 41. The trigger 47 resembles a slide and is biased by a return spring 50 so that it normally remains in the idle position shown in FIG. 2. When the trigger is pushed downwardly, as viewed in FIG. 2, its arm 48 transmits motion to the stop pin 49 to rotate the escapement wheel 41 in a counterclockwise direction. The arm 48 is elastic and is provided with an inclined face 48a. The trigger 47 is further provided with a projection or stud 54 which may rock one arm of a two-armed blocking lever 55. The lever 55 is rockable on a pivot pin 56 and is biased by a torsion spring 57 which tends to rotate it in a clockwise direction, as viewed in FIG. 2, so that the left-hand arm of the lever 55 extends into the pathway of the stud 54. The spring 57 normally maintains the other arm of the blocking lever 55 in engagement with a disk 59 which is mounted on the shaft 8 of the shutter 6. As shown, the periphery of the disk 59 is provided with a notch 58 which receives the tip of the blocking lever 55 when the shutter 6 is held against rotation.

The camera of FIGS. 1 to 4 is operated as follows:

When the objective 2, 3 is trained upon a subject, light of certain intensity will pass through the lens components and will be reflected by the grid 30 to impinge against the photoelectric resistor 11. Therefore, the rotor 14 of the galvanometer 13 assumes a corresponding angular position and keeps the diaphragm mechanism 16 in a position which is a function of the light intensity. The size of the opening 16a is then adjusted in such a way that a certain amount of light can enter through the lens component 2, i.e., the intensity of light which will be allowed to reach the film 5 when the shutter 6 rotates is just enough to make a satisfactory exposure. The strength of the current flowing through the lead 24 is then the same as the strength of the current flowing through the lead 25. If the intensity of light increases, more light will reach the resistor 11 and its resistance decreases so that the strength of current flowing through the lead 24 exceeds that of the current flowing through the lead 25. Consequently, the force acting upon the coil 17 causes the rotor 14 to assume a new angular position in which the size of the diaphragm opening 16a is reduced so that, when the picture is taken, less light will be allowed to reach the film 5. The new angular position of the rotor 14 corresponds to such condition of the circuit shown in FIG. 4 in which the strength of the current flowing through the lead 24 is again the same as that of the current flowing through the lead 25. The rotor 14 will turn in the opposite direction to allow more light to reach the film 5 when the shutter 6 rotates if the intensity of light entering through the lens component 3 decreases so that the resistance of the photoelectric resistor 11 increases and the strength of the current flowing through the lead 25 exceeds the strength of the current flowing through the lead 24. The current flowing through the coil 18 is then stronger than the current which flows through the coil 17; therefore, the size of the diaphragm opening 16a will be changed until it is again a function of the intensity of light coming from the subject or scene to be photographed. The diaphragm mechanism 16 comes to a halt when the strength of the currents flowing through the coils 17, 18 (i.e., through the leads 24 and 25) is again the same.

If the operator decides to shift the trigger 47 in a direction to expand the return spring 50, the arm 48 engages the stop pin 49 and rotates the escapement wheel 41 in a counterclockwise direction until the inclined face 48a of the arm 48 moves beyond the pin 49. This causes the lobe 52 of the cam 39 to move to the phantom-line position 52' shown in FIG. 4, but the pin 35 remains in contact with the spring 33 because the bell crank lever 36 is biased by the spring 53, i.e., the control switch 31 remains closed.

As soon as the inclined face 48a of the arm 48 moves beyond the stop pin 49, the escapement wheel 41 begins to rotate in a clockwise direction because it is biased by a spring 51, whereby the lobe 52 causes the bell crank lever 36 to turn in a counterclockwise direction so that the pin 35 moves away from the spring 33. This opens the control switch 31 and the circuit of the battery 12 for a period of time whose length depends on the configuration and dimensions of the lobe 52 and also on the bias of the spring 51.

After the inclined face 48a of the arm 48 moves beyond the stop pin 49, the stud 54 reaches the left-hand arm of the blocking lever 55 and rotates this lever in a counterclockwise direction (against the bias of the torsion spring 57) so that the tip of the upwardly extending arm of the lever 55 moves away from the notch 58 in the disk 59 and the shaft 8 can rotate with the shutter 6. The parts shown in FIG. 2 are assembled in such a way that the circuit of the battery 12 remains open for an interval of time whose length equals the length of the interval necessary to accelerate the shutter 6 to full operating speed. The rotor 14 of the galvanometer 13 retains the diaphragm mechanism 16 in the previously selected position because the current ceases to flow through the coils 17 and 18 as soon as the pin 35 moves away from the spring 33, i.e., as soon as the control switch 31 opens.

The escapement anchor 43 controls the speed at which the escapement wheel 41 and cam 39 can return to their solid-line positions shown in FIG. 2, and the retarding action of the anchor 43 is selected in such a way that the control switch 31 including the spring 33 and pin 35 closes at the time when the shutter 6 reaches its full speed. The circuit of the galvanometer 13 is then completed and this galvanometer thereupon functions in the normal way to change the position of the diaphragm mechanism 16 and to thereby adjust the size of the opening 16a in dependency on the intensity of light passing through the objective 2, 3 and impinging against the photoelectric resistor 11.

When the operator releases the trigger 47, the inclined face 48a of the arm 48 slides along the pin 49 and returns to the position of FIG. 2. Such return movement of the arm 48 is possible because it consists of elastic material and the top end of the pin 49 is slanted. While the trigger 47 continues to move upwardly, as viewed in FIG. 2, the stud 54 moves away from the blocking lever 55 and allows the latter to reenter the notch 58 of the disk 59 whereby the shutter 6 is arrested. The angular position of the notch 58 shown in FIG. 2 corresponds to such angular position of the shutter 6 in which the grid 30 is located in the path of light rays 10 passing through the lens components 2 and 3 so that the intensity of light reaching the resistor 11 when the shutter 6 is idle will be less than the intensity of light when the light rays 10 are reflected by the mirror-like portion 9a of the surface 9 on the shutter 6.

It is clear that the control switch 31 of FIG. 2 may be replaced by other types of switches without in any way departing from the spirit of my invention. The structure shown in FIG. 2 could be replaced by a pneumatically or electrically operated switch, for example, by an electrically or mechanically controlled relay switch of any known design. All that counts is to reduce the current strength or to open the circuit of the battery 12 at the time when the shutter 6 is being accelerated from zero speed to normal operating speed.

It is clear that the shutter 6 could be modified by replacing the grid 30 with a surface whose reflectivity is the same as that of the surface portion 9a. The circuit of the galvanometer 13 then comprises one or more suitable resistors through which the current flows only when the shutter 6 is idle and which reduce the current strength sufficiently to compensate for such reduction in the intensity of light reaching the resistor 11 which will take place when the shutter has been accelerated to full speed (as compared with the intensity of light which reaches the resistor 11 when the shutter is idle). It is also possible to utilize a gray filter which is moved in front of the light reflecting surface when the shutter is idle, such filter then replacing the grid 30.

Of course, one could prevent oscillation of the rotor 14 if the camera would utilize a less sensitive exposure meter. However, a less sensitive exposure meter would be unable to react in response to changes in illumination when the camera is in operation.

Figure 5:
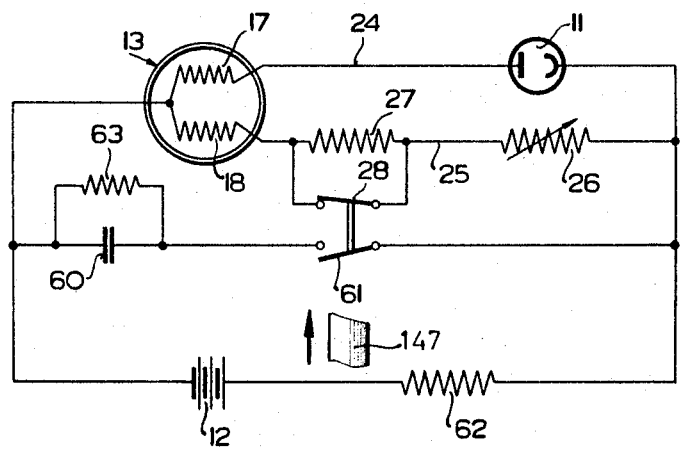
FIG. 5 illustrates the electric circuit of a modified motion picture camera wherein the control switch of FIG. 2 is replaced by a capacitor which is used to reduce the flow of current through the coils of the galvanometer during acceleration of the shutter to its normal operating speed.

In the embodiment of FIG. 5, the lead 25 contains a fixed resistor 27 which can be bridged or bypassed by closing a switch 28. The switch 28 is operatively connected with and may be closed by a release trigger 147.

The strength of the current flowing in the circuit of the photoelectric resistor 11 and galvanometer 13 shown in FIG. 5 is reduced whenever the shutter 6 is being accelerated from zero speed to normal speed. The reductioin of current flow is effected by a capacitor 60 which is connected in parallel with the galvanometer 13 and in series with a switch 61. The switch 61 is coupled to the switch 28 and the battery 12 is connected in series with a resistor 62. The capacitor 60 is connected in parallel with a discharge resistor 63. When the trigger 147 of the camera embodying the structure shown in FIG. 5 is actuated to release the shutter 6 so that the motor M may drive the shutter, the trigger 147 opens the switch 28 and simultaneously closes the switch 61. Thus, the capacitor 60 is being charged while the current must flow through the resistor 27 because the switch 28 is open. At the time the capacitor 60 is being charged, a very weak current flows through the galvanometer 13 and such current is too weak to effect a change in the size of the diaphragm opening 16a. The condition of the circuit changes when the capacitor 60 is fully charged so that, after such charging of the capacitor, the galvanometer 13 will again change the size of the diaphragm opening 16a in response to changes in intensity of the light coming from the subject.

When the operator releases the trigger 147, the switch 28 closes and the switch 61 opens so that the switch 28 bridges the resistor 27 and the capacitor 60 discharges across the resistor 63. Depending on the dimensioning of the parts 60 and 63, the length of the interval during which the flow of current in the coils 17, 18 is reduced and the exact time of discharge of the capacitor 60 may be selected with a view to insure that the rotor 14 will not oscillate while the shutter 6 is being accelerated from zero speed to normal operating speed. Thus, the capacitor 60 could be replaced by a variable capacitor and/or the resistor 63 could be replaced by a variable resistor.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a motion-picture camera, a normally idle rotary shutter defining an aperture and having a light reflecting surface; objective means for directing light coming from a subject against said shutter so that such light is reflected by said surface when the aperture is out of registry with said objective means; means for intermittently driving said shutter at a predetermined speed whereby the acceleration of said shutter from zero speed to said predetermined speed requires a predetermined interval of time with attendant fluctuations in the intensity of reflected light; exposure meter means comprising a movable portion whose position is a function of the intensity of reflected light so that said movable portion tends to oscillate during acceleration of said shutter; diaphragm means operatively connected with said exposure meter means and defining a variable opening whose size is a function of the position of said movable portion; and means for fixing said movable portion against movement during acceleration of said shutter to prevent variations in the size of said opening during said interval.

2. In a camera, an objective; a shutter rotatable about a fixed axis and defining an aperture through which light entering through said objective passes during a portion of each revolution of the shutter, said shutter having a surface which reflects light when said aperture is moved out of registry with the objective and said surface having a zone of lesser reflectivity located in the path of light when the shutter is idle and a zone of greater reflectivity, the difference in reflectivity of said zones being such that the intensity of reflected light when the shutter is idle at least approximates average intensity of reflected light during a full revolution of the shutter at a predetermined speed; a photoelectric resistor located in the path of reflected light so that its resistance is a function of the intensity of such light; a source of electrical energy connected in circuit with said resistor; a galvanometer connected in said circuit and having a movable portion whose position varies as a function of said resistance, said movable portion being idle when the current strength drops to below a given value; means for reducing the current strength to below said given value during acceleration of said shutter to said predetermined speed; and a diaphragm mechanism defining an opening whose size is variable by said movable portion so that, during said acceleration, the size of said opening remains unchanged and such size corresponds to that immediately preceding acceleration of the shutter.

3. In a motion-picture camera, an objective; a shutter rotatable about a fixed axis and defining an aperture through which light entering from a subject through said objective can pass during a portion of each revolution of the shutter, said shutter having a surface which reflects light when said aperture is moved out of registry with said objective and said surface having a first portion of reduced reflectivity located in the path of said light when the shutter is idle and a second portion of greater reflectivity, the difference in reflectivity of said portions being such that the intensity of reflected light when the shutter is idle at least approximates average intensity of reflected light during a full revolution of the shutter at a predetermined speed; a photoelectric resistor located in the path of reflected light so that its resistance is a function of the intensity of such light; a source of electrical energy connected in circuit with said resistor; a galvanometer connected in said circuit and comprising a rotor whose position varies as a function of said resistance, said rotor being idle when the strength of current flowing through said galvanometer drops below a given value and said rotor tending to oscillate during acceleration of said shutter; means for reducing the strength of current to below said given value during acceleration of said shutter to prevent oscillation of said rotor; and a diaphragm mechanism defining an opening whose size is variable by said rotor so that, during said acceleration, the size of said opening remains unchanged, and such size corresponds to that immediately preceding acceleration of the shutter.

4. In a motion-picture camera, a movable shutter defining an aperture and having a light reflecting surface, said shutter being adapted to be held at a standstill, to be accelerated to a predetermined speed, and to move at such predetermined speed; objective means for directing light coming from a subject against said shutter so that such light is reflected by said light reflecting surface; adjustable diaphragm means arranged in the path of light directed by said objective means; automatic photoelectric means; adjusting means for adjusting said diaphragm means in dependency on the intensity of light reflected by said light reflecting surface; and means for blocking adjustment of said diaphragm means by said adjusting means during acceleration of said shutter while simultaneously maintaining said diaphragm means in a position of adjustment corresponding to that immediately preceding acceleration of said shutter.

5. In a camera, an objective; a shutter rotatable about a fixed axis and defining an aperture through which light entering through said objective passes during a portion of each revolution of the shutter, said shutter having a surface which reflects light when said aperture is moved out of registry with the objective and said surface having a zone of lesser reflectivity located in the path of light when the shutter is idle and a zone of greater reflectivity, the difference in reflectivity of said zones being such that the intensity of reflected light when the shutter is idle at least approximates average intensity of reflected light during a full revolution of the shutter at a predetermined speed; means for rotating said shutter; blocking means for normally maintaining said shutter in idle position; trigger means for disengaging said blocking means at the will of the operator so that the shutter then begins to rotate and is accelerated to said predetermined speed; a photoelectric resistor located in the path of reflected light so that its resistance is a function of the intensity of such light; a source of electrical energy connected in circuit with said resistor; a galvanometer connected in said circuit and having a movable portion whose position varies as a function of said resistance, said movable portion being idle when the current strength drops to below a given value; control means for opening said circuit during acceleration of said shutter including a normally closed control switch connected in said circuit and arranged to open in response to actuation of said trigger means so as to open said circuit, and retarding means for closing said switch upon elapse of said interval; and a diaphragm mechanism defining an opening whose size is variable by said movable portion so that, during said acceleration, the size of said opening remains unchanged.

6. A structure as set forth in claim 5, wherein said retarding means comprises a spring biased escapement wheel, an escapement anchor cooperating with said wheel, and means for rotating said escapement wheel against such bias in response to actuation of said trigger means.

7. In a camera, an objective; a shutter arranged to perform cyclical movements and defining an aperture through which light entering through said objective means passes during a portion of each cycle of the shutter, said shutter having a surface which reflects light when said aperture is moved out of registry with the objective and said surface having a zone of lesser reflectivity located in the path of light when the shutter is idle and a zone of greater reflectivity, the difference in reflectivity of said zones being such that the intensity of reflected light when the shutter is idle at least approximates average intensity of reflected light during a full cycle of the shutter at a predetermined speed; a photoelectric resistor located in the path of reflected light so that its resistance is a function of the intensity of such light; a source of electrical energy connected in circuit with said resistor; a galvanometer connected in said circuit and having a movable portion whose position varies as a function of said resistance, said movable portion being idle when the current strength drops to below a given value; means for interrupting the flow of current in said circuit during acceleration of said shutter to said predetermined speed; and a diaphragm mechanism defining an opening whose size is variable by said movable portion so that, during said acceleration, the size of said opening remains unchanged and such size corresponds to that immediately preceding acceleration of the shutter.

8. A structure as set forth in claim 7, wherein said interrupting means comprises a normally closed control switch and means for opening said switch during acceleration of said shutter.

9. In a camera, an objective; a shutter rotatable about a fixed axis and defining an aperture through which light entering through said objective passes during a portion of each revolution of the shutter, said shutter having a surface which reflects light when said aperture is moved out of registry with the objective and said surface having a zone of lesser reflectivity located in the path of light when the shutter is idle and a zone of greater reflectivity, the difference in reflectivity of said zones being such that the intensity of reflected light when the shutter is idle at least approximates average intensity of reflected light during a full revolution of the shutter at a predetermined speed; means for rotating said shutter; blocking means for normally maintaining said shutter in idle position; trigger means for disengaging said blocking means at the will of the operator so that the shutter then begins to rotate and is accelerated to said predetermined speed; a photoelectric resistor located in the path of reflected light so that its resistance is a function of the intensity of such light; a source of electrical energy connected in circuit with said resistor; a galvanometer connected in said circuit and having a movable portion whose position varies as a function of said resistance, said movable portion being idle when the current strength drops to below a given value; means for reducing the current strength to below said given value during acceleration of said shutter to said predetermined speed including a capacitor in parallel with said galvanometer and a normally open switch connected in series with said capacitor, said switch being closed by said trigger means during acceleration of said shutter so that the capacitor is charged with attendant reduction in the strength of current flowing through said galvanometer to below said predetermined value; and a diaphragm mechanism defining an opening whose size is variable by said movable portion so that, during said acceleration, the size of said opening remains unchanged.

10. A structure as set forth in claim 9, wherein said galvanometer comprises two coils connected in parallel leads of said circuit, one of said coils being connected in series with said photoelectric resistor and said circuit further comprising an additional resistor connected in series with the other of said coils.

11. A structure as set forth in claim 10, further comprising a normally closed switch connected in parallel with said additional resistor and arranged to be opened by said trigger means during acceleration of said shutter.

12. A structure as set forth in claim 9, further comprising a discharge resistor connected in said circuit across said capacitor so that the capacitor may be discharged in response to opening of said switch.

13. In a motion-picture camera, a movable shutter defining an aperture and having a light reflecting surface; means for normally blocking said shutter; drive means for moving said shutter at a predetermined speed; trigger means for disengaging said blocking means so that the shutter may be moved by said drive means and the acceleration of the shutter to said predetermined speed takes up a certain interval of time; an adjustable diaphragm mechanism; a light reflecting surface provided on said shutter and arranged to reflect light coming from a subject when said aperture is out of registry with the objective; an exposure meter operatively connected with and adapted to adjust said diaphragm mechanism, said exposure meter comprising a light-sensitive member which initiates adjustments of said diaphragm mechanism as a function of the intensity of reflected light; and control means for preventing adjustment of said diaphragm mechanism during acceleration of said shutter so that the adjustment of said diaphrgam mechanism during acceleration of the shutter corresponds to that immediately preceding such acceleration.

14. A structure as set forth in claim 13, wherein said control means is actuated by said trigger means.

References Cited

UNITED STATES PATENTS

| 3,099,193 | 7/1963 | Freudenschuss | 352—141 |
| 3,188,935 | 6/1965 | Lieser et al. | 95—64 |

JULIA E. COINER, *Primary Examiner.*